United States Patent
Tsai et al.

(10) Patent No.: US 9,130,642 B2
(45) Date of Patent: *Sep. 8, 2015

(54) FREQUENCY-SELECTIVE CIRCUIT WITH MIXER MODULE IMPLEMENTED FOR CONTROLLING FREQUENCY RESPONSE, AND RELATED SIGNAL PROCESSING APPARATUS AND METHOD

(75) Inventors: Ming-Da Tsai, Miaoli County (TW); Siu-Chuang Ivan Lu, San Jose, CA (US)

(73) Assignee: MEDIATEK INC., Science Based Industrial Park, Hsin-Chu (TW)

( * ) Notice: Subject to any disclaimer, the term of this patent is extended or adjusted under 35 U.S.C. 154(b) by 268 days.

This patent is subject to a terminal disclaimer.

(21) Appl. No.: 12/959,345

(22) Filed: Dec. 2, 2010

(65) Prior Publication Data

US 2011/0230151 A1    Sep. 22, 2011

Related U.S. Application Data

(60) Provisional application No. 61/315,066, filed on Mar. 18, 2010, provisional application No. 61/370,270, filed on Aug. 3, 2010.

(51) Int. Cl.
| | |
|---|---|
| *H04B 1/26* | (2006.01) |
| *H04B 1/16* | (2006.01) |
| *H04B 1/04* | (2006.01) |

(52) U.S. Cl.
CPC ............ *H04B 1/1638* (2013.01); *H04B 1/0475* (2013.01)

(58) Field of Classification Search
CPC ........ H04B 1/109; H04B 1/30; H04B 1/0475; H04B 1/1638

USPC .............. 455/150.1, 118, 293, 296, 232, 333; 375/316

See application file for complete search history.

(56) References Cited

U.S. PATENT DOCUMENTS

| | | | | |
|---|---|---|---|---|
| 5,130,669 | A | * | 7/1992 | Wignot et al. ................. 330/306 |
| 5,870,670 | A | * | 2/1999 | Ripley et al. .................. 455/304 |

(Continued)

FOREIGN PATENT DOCUMENTS

| | | |
|---|---|---|
| CN | 1370024 A | 9/2002 |
| CN | 2602550 Y | 2/2004 |

(Continued)

OTHER PUBLICATIONS

Kim, "A Highly Linear SAW-less CMOS Receiver Using a Mixer with Embedded Tx Filtering for CDMA", pp. 729-732, IEEE 2008 Custom Intergrated Circuits Conference (CICC).

(Continued)

*Primary Examiner* — Yuwen Pan
*Assistant Examiner* — Fatuma Sherif
(74) *Attorney, Agent, or Firm* — Winston Hsu; Scott Margo

(57) ABSTRACT

A frequency-selective circuit includes a signal input port, a signal output port, and a frequency response control block. The frequency response control block includes a mixer module and a filter module. The mixer module has a first port electrically connected to a signal path between the signal input port and the signal output port, a second port electrically connected to the filter module, and a local oscillator (LO) port. The mixer module operates according to an LO input received by the LO port. The filter module is electrically connected to the second port of the mixer module.

17 Claims, 15 Drawing Sheets

(56) References Cited

U.S. PATENT DOCUMENTS

| | | | |
|---|---|---|---|
| 6,215,828 B1 | 4/2001 | Signell | |
| 6,625,436 B1* | 9/2003 | Tolson et al. | 455/334 |
| 6,658,237 B1* | 12/2003 | Rozenblit et al. | 455/83 |
| 7,369,820 B2* | 5/2008 | Rahman | 455/126 |
| 8,121,577 B1* | 2/2012 | McKay | 455/326 |
| 8,175,552 B2 | 5/2012 | Takemura | |
| 2005/0164669 A1 | 7/2005 | Molnar | |
| 2006/0154638 A1* | 7/2006 | Zheng et al. | 455/302 |
| 2007/0164826 A1* | 7/2007 | Chang et al. | 330/311 |
| 2008/0003970 A1* | 1/2008 | Cowley et al. | 455/307 |
| 2008/0303589 A1* | 12/2008 | Kang et al. | 327/558 |
| 2009/0275304 A1 | 11/2009 | Thomas | |
| 2009/0291652 A1* | 11/2009 | Takemura | 455/118 |
| 2010/0267354 A1* | 10/2010 | Mirzaei et al. | 455/307 |
| 2011/0206088 A1 | 8/2011 | Binder | |
| 2012/0083236 A1 | 4/2012 | Thomas | |

FOREIGN PATENT DOCUMENTS

| | | |
|---|---|---|
| CN | 1647400 A | 7/2005 |
| CN | 101436869 A | 5/2009 |
| TW | 200939647 | 9/2009 |
| TW | 201006163 | 2/2010 |

OTHER PUBLICATIONS

Darabi, "A Blocker Filtering Technique for SAW-Less Wireless Receivers", IEEE Journal of Solid-State Circuits, pp. 2766-2773, Vol. 42, No. 12, Dec. 2007.

Chih-Hao Sun; Ayazian, S.; Xin Wang; Gharpurey, R., "Interference cancellation in receivers with interference frequency estimation," Circuits and Systems Workshop: System-on-Chip-Design, Applications, Integration, and Software, 2008 IEEE Dallas, Oct. 19-20, 2008.

Safarian, A.; Shameli, A.; Rofougaran, A.; Rofougaran, M.; De Flaviis, F., "Integrated Blocker Filtering RF Front Ends," Radio Frequency Integrated Circuits (RFIC) Symposium, 2007 IEEE, pp. 13-16, Jun. 3-5, 2007.

Khatri, H.; Gudem, P.S.; Larson, L.E., "A SAW-less CMOS CDMA Receiver with Active Tx Filtering," Custom Integrated Circuits Conference, 2009. CICC '09. IEEE, pp. 379-382, Sep. 13-16, 2009.

* cited by examiner

FREQUENCY-SELECTIVE CIRCUIT WITH MIXER MODULE IMPLEMENTED FOR CONTROLLING FREQUENCY RESPONSE, AND RELATED SIGNAL PROCESSING APPARATUS AND METHOD

CROSS REFERENCE TO RELATED APPLICATIONS

This application claims the benefit of U.S. Provisional Application No. 61/315,066 (filed on Mar. 18, 2010) and U.S. Provisional Application No. 61/370,270 (filed on Aug. 3, 2010). The entire contents of these related applications are incorporated herein by reference.

BACKGROUND

The disclosed embodiments of the present invention relate to providing a frequency-selective signal path, and more particularly, to a frequency-selective circuit with a mixer module implemented for controlling a frequency response of the frequency-selective circuit, and related signal processing apparatus and method.

In general, a wireless communication receiver is required to have the capability of detecting weak signals in the desired frequency band. Specifically, the wireless communication receiver is required to detect in-band signals in the presence of very strong out-of-band (OOB) signals (i.e., blocker signals). The most common solution to solving problems caused by very strong blocker signals is to use very high quality factor (Q) bandpass filters at the input of the wireless communication receiver. For example, surface acoustic wave (SAW) filters may be employed to offer the desired attenuation of OOB blocker signals. However, using SAW filters leads to significantly increased cost and circuit board area.

Thus, there is a need for an innovative design which can effectively attenuate or eliminate the unwanted signal components (e.g., the blocker signals) by using a simple circuit architecture.

SUMMARY

In accordance with exemplary embodiments of the present invention, a frequency-selective circuit with a mixer module implemented for controlling a frequency response of the frequency-selective circuit, and related signal processing apparatus and method are proposed to solve the above-mentioned problem.

According to a first aspect of the present invention, an exemplary frequency-selective circuit is disclosed. The exemplary frequency-selective circuit includes a signal input port, a signal output port, and a frequency response control block. The frequency response control block includes a mixer module and a filter module. The mixer module has a first port, a second port, and a local oscillator (LO) port, wherein the first port is electrically connected to a signal path between the signal input port and the signal output port, and the mixer module operates according to an LO input received by the LO port. The filter module is electrically connected to the second port of the mixer module.

According to a second aspect of the present invention, an exemplary signal processing apparatus is disclosed. The exemplary signal processing apparatus includes a frequency-selective circuit and a signal processing circuit. The frequency-selective circuit includes a signal input port, a signal output port, and a frequency response control block. The frequency response control block is electrically connected to a signal path between the signal input port and the signal output port, and arranged to control a frequency response of the frequency-selective circuit according to a frequency of an oscillating signal. The signal processing circuit includes a first circuit module and a second circuit module. The first circuit module is electrically connected to the signal input port and arranged to deal with an input signal received by the signal input port. The second circuit module is electrically connected to the signal output port and arranged to deal with an output signal generated from the signal output port.

According to a third aspect of the present invention, an exemplary method of setting a frequency selectivity characteristic of a signal processing apparatus is disclosed. The exemplary method includes the following steps: configuring a first signal processing path, included in the signal processing apparatus and electrically connected to a signal input port of the signal processing apparatus, to have a first input impedance response; and configuring a second signal processing path, included in the signal processing apparatus and electrically connected to the signal input port, to have a second input impedance response different from the first input impedance response.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "electrically connected " is intended to mean either an indirect or direct electrical connection. Accordingly, if one device is electrically connected to another device, that connection may be through a direct electrical connection, or through an indirect electrical connection via other devices and connections.

Figure 1:
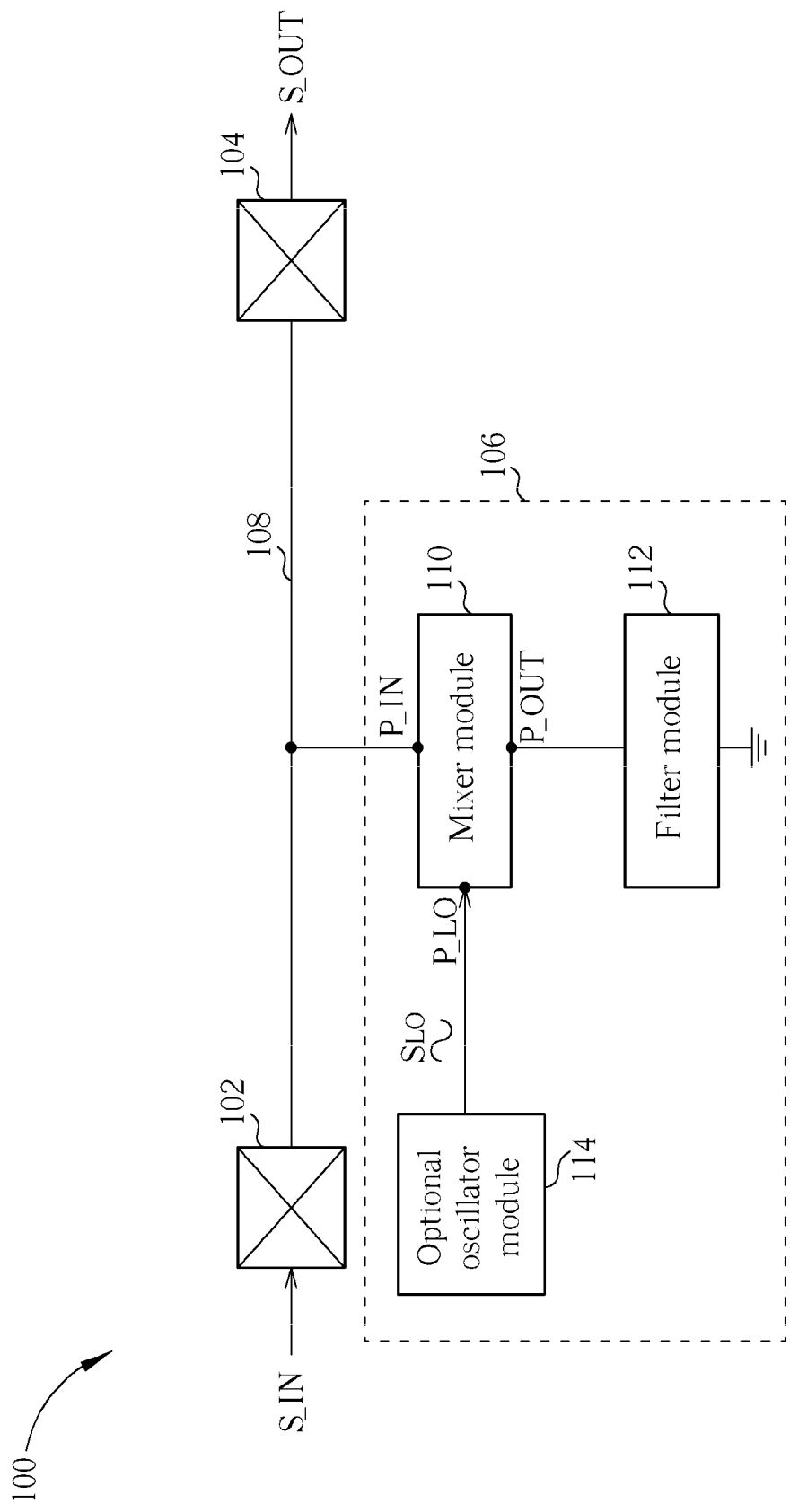
FIG. 1 is a diagram illustrating a frequency-selective circuit according to a first exemplary embodiment of the present invention.

Please refer to FIG. 1, which is a diagram illustrating a frequency-selective circuit according to a first exemplary embodiment of the present invention. The exemplary frequency-selective circuit 100 includes, but is not limited to, a signal input port 102, a signal output port 104, and a frequency response control block 106. The signal input port 102 is arranged to receive an input signal S_IN of the frequency-selective circuit 100. The signal output port 104 is electrically connected to the signal input port 102 via a signal path 108, and the signal output port 104 is arranged to output an output signal S_OUT of the frequency-selective circuit 100. In this exemplary embodiment, the frequency response control block 106 is arranged to control a frequency response presented at the signal path 108, and therefore includes, but is not limited to, a mixer module 110, a filter module 112, and an optional oscillator module 114. The mixer module 110 has a first port P_IN, a second P_OUT, and a local oscillator (LO) port P_LO, wherein the first port P_IN is electrically connected to the signal path 108, the second port P_OUT is electrically connected to the filter module 112, and the LO port P_LO is electrically connected to the optional oscillator module 114. The mixer module 110 operates according to an LO input $S_{LO}$ received at the LO port P_LO, and the frequency response presented at the signal path 108 is controlled by a frequency of the LO input $S_{LO}$. In one exemplary design, the mixer module 110 may be implemented using a passive mixer, and the filter module 112 may be implemented using a capacitive load. However, this is for illustrative purposes only. In an alternative design, the mixer module 110 may be implemented using an active mixer and/or the filter module 112 may be realized using other filter architecture, depending upon actual design consideration.

The oscillator module 114 is electrically connected to the mixer module 110, and arranged to generate the LO input $S_{LO}$ to the mixer module 110. By way of example, but not limitation, the oscillator module 114 may be implemented using a frequency divider and a controllable oscillator such as a voltage-controlled oscillator (VCO), where the VCO generates an oscillating signal, and the frequency divider outputs the LO input $S_{LO}$ with a desired frequency by dividing the frequency of the oscillating signal. Alternatively, the oscillator module 114 may be implemented using a phase-locked loop (PLL) or a crystal oscillator. Moreover, the above-mentioned oscillator module 114 may be arranged to directly generate the LO input $S_{LO}$ with a constant LO frequency or generate the LO input $S_{LO}$ by fine-tuning the LO frequency.

It should be noted that the oscillator module 114 included in the frequency response control block 106 is optional. That is, in a case where a particular application which employs the frequency-selective circuit 100 has a clock source disposed outside of the frequency-selective circuit 100 for providing a clock signal that can also serve as the desired LO input $S_{LO}$, the oscillator module 114 shown in FIG. 1 may be omitted. The operation of the frequency-selective circuit 100 is detailed as below.

Figure 2:
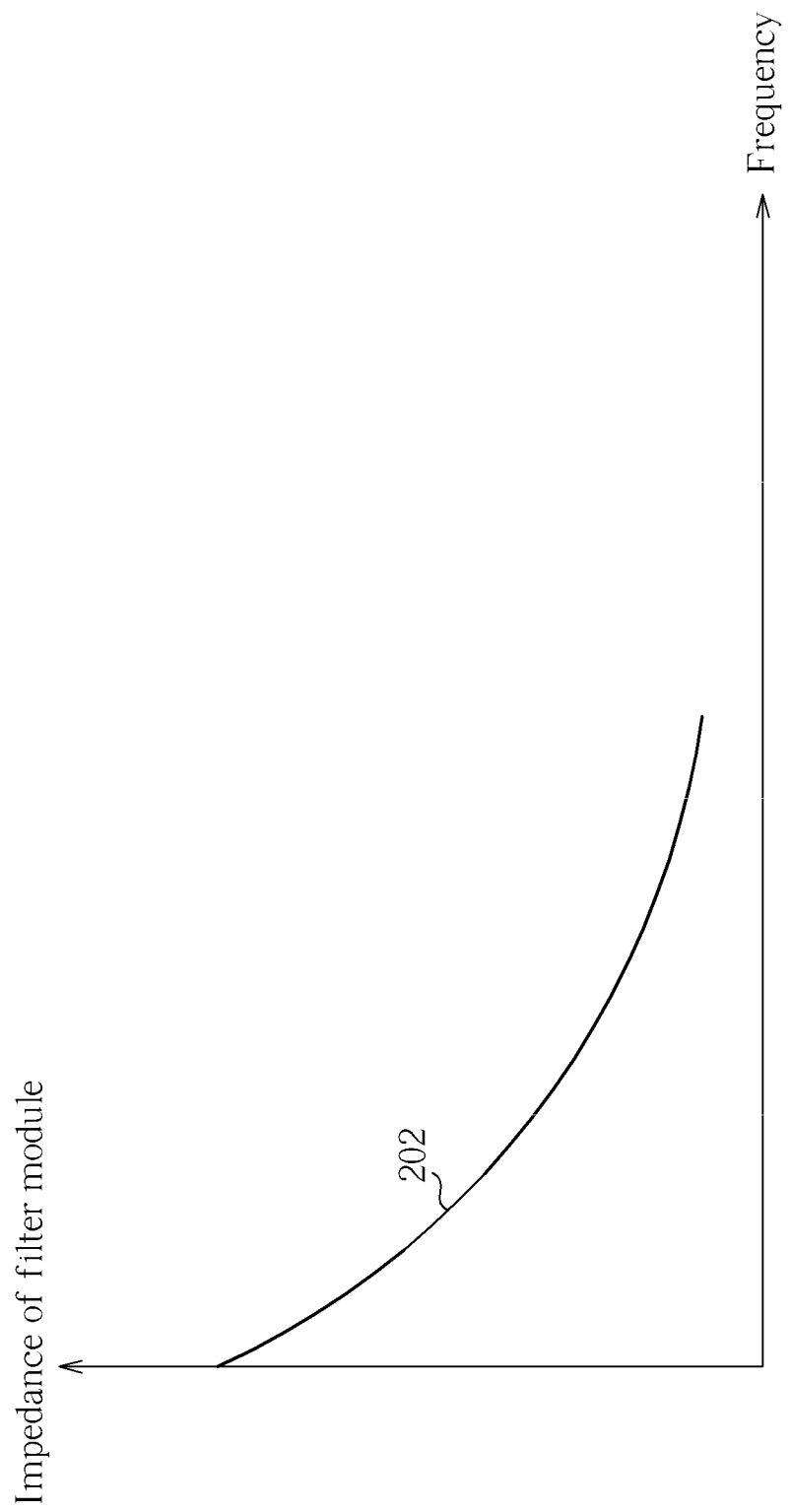
FIG. 2 is a diagram illustrating an exemplary impedance response of a filter module shown in FIG. 1.
Figure 3:
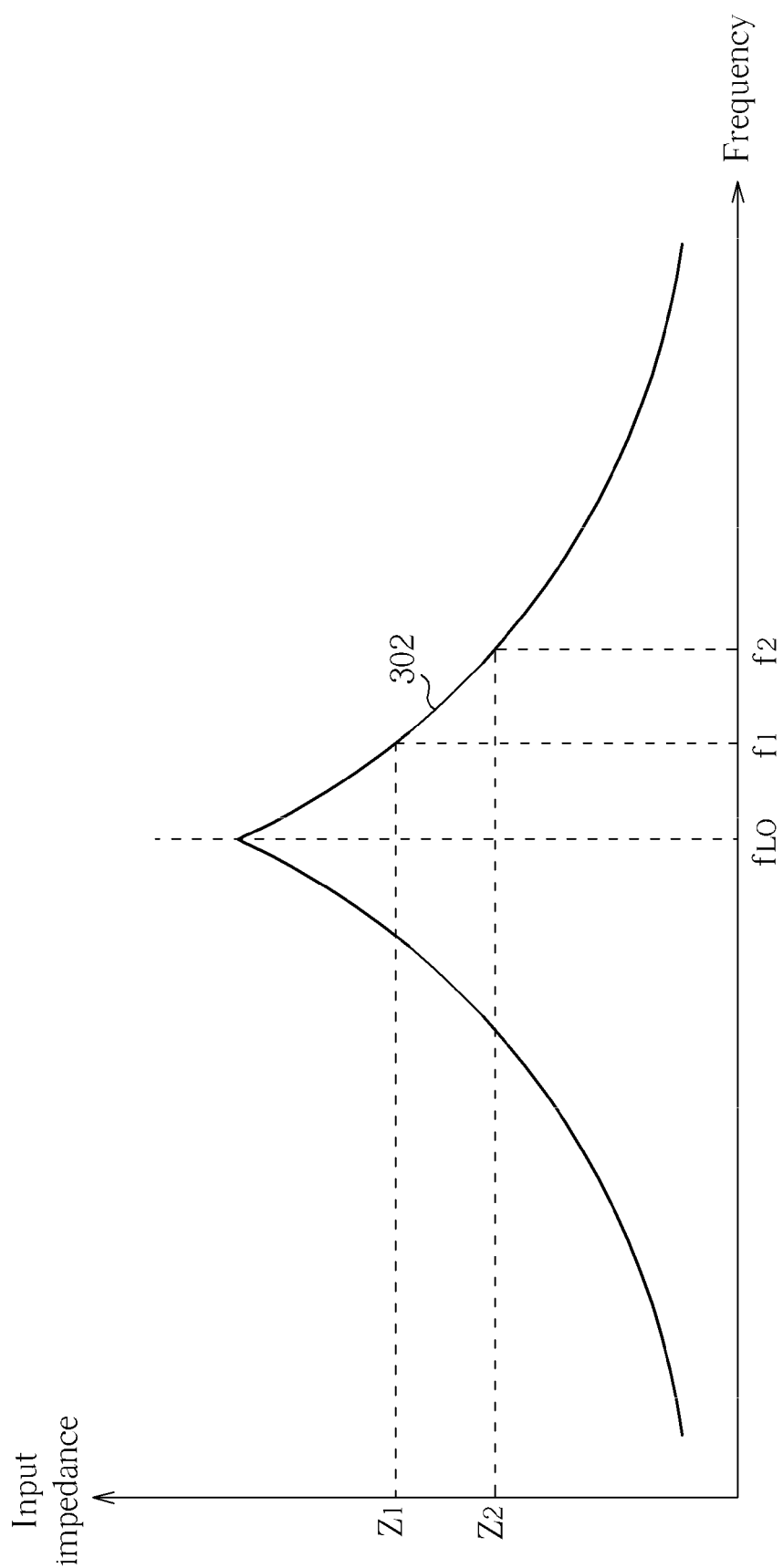
FIG. 3 is a diagram of an exemplary input impedance response of a frequency response control block shown in FIG. 1.

Please refer to FIG. 2 in conjunction with FIG. 3. FIG. 2 is a diagram illustrating an exemplary impedance response 202 of the filter module 112 shown in FIG. 1, and FIG. 3 is a diagram of an exemplary input impedance response 302 of the frequency response control block 106 shown in FIG. 1. The frequency response of the impedance of the filter module (e.g., a capacitive load) 112 can be translated to the frequency $f_{LO}$ of the LO input $S_{LO}$ by the mixer module (e.g., a passive mixer) 110 which operates according to the LO input $S_{LO}$. As can be seen from the characteristic curve 302 which represents the input impedance response 302 of the frequency response control block 106, the input impedance response of the frequency response control block 106 (i.e., the frequency response of an input impedance looking into the first port P_IN of the mixer module 110) has a first impedance value $Z_1$ at a first frequency $f_1$ and a second impedance value $Z_2$ at a second frequency $f_2$, wherein an offset between the first frequency $f_1$ and the frequency $f_{LO}$ of the LO input $S_{LO}$ is smaller than an offset between the second frequency $f_2$ and the frequency $f_{LO}$ of the LO input $S_{LO}$, and the first impedance value $Z_1$ is greater than the second impedance value $Z_2$. More specifically, in accordance with the impedance response of the filter module 112 as represented by the characteristic curve 202 shown in FIG. 2, the input impedance response of the frequency response control block 106 therefore has a maximum impedance value at the frequency $f_{LO}$ of the LO input $S_{LO}$. Therefore, when a signal component with a frequency far away from the frequency $f_{LO}$ of the LO input $S_{LO}$ is transmitted via the signal path 108, the frequency response control block 106 has a lower input impedance presented at the first port P_IN of the mixer module 110. Thus, part or all of the current of such a signal component will be guided to flow through the frequency response control block 106. On the other hand, when a signal component with a frequency close to the frequency $f_{LO}$ of the LO input $S_{LO}$ is transmitted via the signal path 108, the frequency response control block 106 has a higher input impedance presented at the first port P_IN of the mixer module 110. Thus, most or all of the current of such a signal component will arrive at the signal output port 104.

Based on above observation, the frequency response control block 106 can be used to significantly attenuate or completely block the unwanted signal components included in the input signal S_IN, and allow wanted signal components included in the input signal S_IN to arrive at the signal output port 104 with less attenuation or without any attenuation. For example, the input signal S_IN received at the signal input port 102 includes a first signal component with the first frequency $f_1$ and a second signal component with the second frequency $f_2$. As mentioned above, an offset between the first frequency $f_1$ and the frequency $f_{LO}$ of the LO input $S_{LO}$ is smaller than an offset between the second frequency $f_2$ and the frequency $f_{LO}$ of the LO input $S_{LO}$. Therefore, an attenuation applied to the second signal component by the frequency response control block 106 would be greater than an attenuation applied to the first signal component by the frequency response control block 106.

Figure 4:
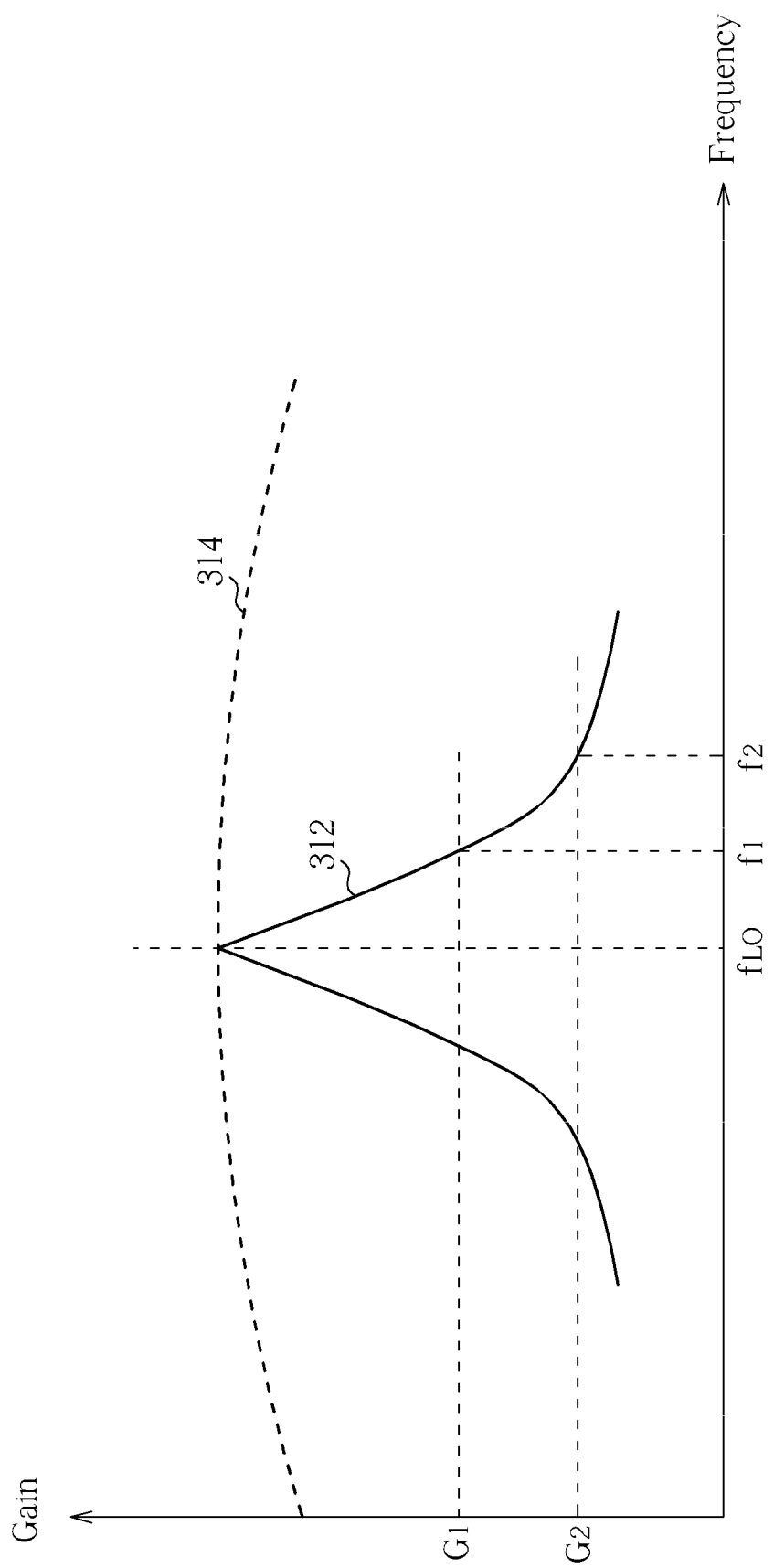
FIG. 4 is a diagram illustrating a frequency response of a frequency-selective circuit shown in FIG. 1.

Please refer to FIG. 4, which is a diagram illustrating a frequency response of the frequency-selective circuit 100 shown in FIG. 1. The characteristic curve 314 shows the frequency response under the condition where the frequency response control block 106 in FIG. 1 is omitted, whereas the characteristic curve 312 shows the frequency response under the condition where the frequency response control block 106 in FIG. 1 is implemented and connected to the signal path 108 in a parallel manner. The frequency response control block 106 with the impedance response 302 enables the frequency-selective circuit 100 to have the frequency response shown in FIG. 4. As can be seen from the figure, the frequency response of the frequency-selective circuit 100 has a first gain $G_1$ at the first frequency $f_1$ and a second gain $G_2$ at the second frequency $f_2$. As mentioned above, an offset between the first frequency $f_1$ and the frequency $f_{LO}$ of the first LO input $S_{LO}$ is smaller than an offset between the second frequency $f_2$ and the frequency $f_{LO}$ of the first LO input $S_{LO}$, and an attenuation applied to the second signal component with the second frequency $f_2$ by the frequency response control block 106 therefore would be greater than an attenuation applied to the first signal component with the first frequency $f_1$ by the frequency response control block 106. As a result, the first gain $G_1$ is greater than the second gain $G_2$. In this exemplary embodiment, the frequency response of the frequency-selective circuit 100 has a maximum gain at the frequency $f_{LO}$ of the first LO input $S_{LO}$. More specifically, as shown in FIG. 4, the frequency response control block 106 in this exemplary embodiment applies no attenuation to a signal component with a frequency identical to the frequency $f_{LO}$ of the first LO input $S_{LO}$ due to a maximum input impedance presented at the first port P_IN of the mixer module 110.

Please note that the characteristic curves shown in FIG. 2, FIG. 3, and FIG. 4 are for illustrative purposes only. For example, the frequency response of the frequency-selective circuit 100 may be adjusted by making proper modifications to the filter module 112 for changing the impedance response of the filter module 112 and/or controlling a clock source (e.g., the optional oscillator module 114) to change the frequency $f_{LO}$ of the first LO input $S_{LO}$ supplied to the mixer module 110.

As shown in FIG. 1, the frequency-selective circuit 100 is arranged in a single-ended configuration to meet the requirement of a single-ended application. However, the proposed frequency-selective circuit of the present invention may also be arranged in a differential configuration to meet the requirement of a differential application. Please refer to FIG. 5, which is a diagram illustrating a frequency-selective circuit according to a second exemplary embodiment of the present invention. The exemplary frequency-selective circuit 400 includes, but is not limited to, a signal input port 402, a signal output port 404, and a frequency response control block 406. The signal input port 402 is arranged to receive an input signal S_IN which is a differential signal pair including a first input IN+ and a second input IN−, and has a first input node 401_1 for receiving the first input IN+ and a second input node 401_2 for receiving the second input IN−. The signal output port 404 is electrically connected to the signal input port 402 via a signal path 408 including a first path 407_1 and a second path 407_2. The signal output port 404 is arranged to output an output signal S_OUT which is a differential signal pair including a first output OUT+ and a second output OUT−, and has a first output node 403_1 for outputting the first output OUT+ and a second output node 403_2 for outputting the second output OUT−. Similarly, the frequency response control block 406 is arranged to control a frequency response presented at the signal path 408, and therefore includes, but is not limited to, a mixer module 410, a filter module 412, and an optional oscillator module 414. Regarding the frequency-selective circuit 400 operating under a differential mode, the mixer module 110 has a first port including a first input node P_IN+ and a second input node P_IN−, a second port including a first output node P_OUT+ and a second output node P_OUT−, and a local oscillator (LO) port including a first LO node P_LO+ and a second LO node P_LO−.

By way of example, but not limitation, the mixer module 410 may be implemented using two passive mixers or active mixers, the filter module 412 may be implemented using a capacitive load having two capacitors respectively acting as loads of the mixers in the mixer module 410, and a clock source (e.g., the optional oscillator module 414) may provide an LO input including a first LO signal S_LO+ and a second LO signal S_LO− respectively supplied to the mixers in the mixer module 410. The first LO signal S_LO+ and the second LO signal S_LO− have the same frequency but different phases. For example, there is a 90-degree phase difference between the first LO signal S_LO+ and the second LO signal S_LO−. As a person skilled in the art can readily understand the operation of the frequency-selective circuit 400 arranged in a differential configuration after reading above paragraphs directed to the frequency-selective circuit 100 arranged in a single-ended configuration, further description is omitted here brevity.

Figure 6:
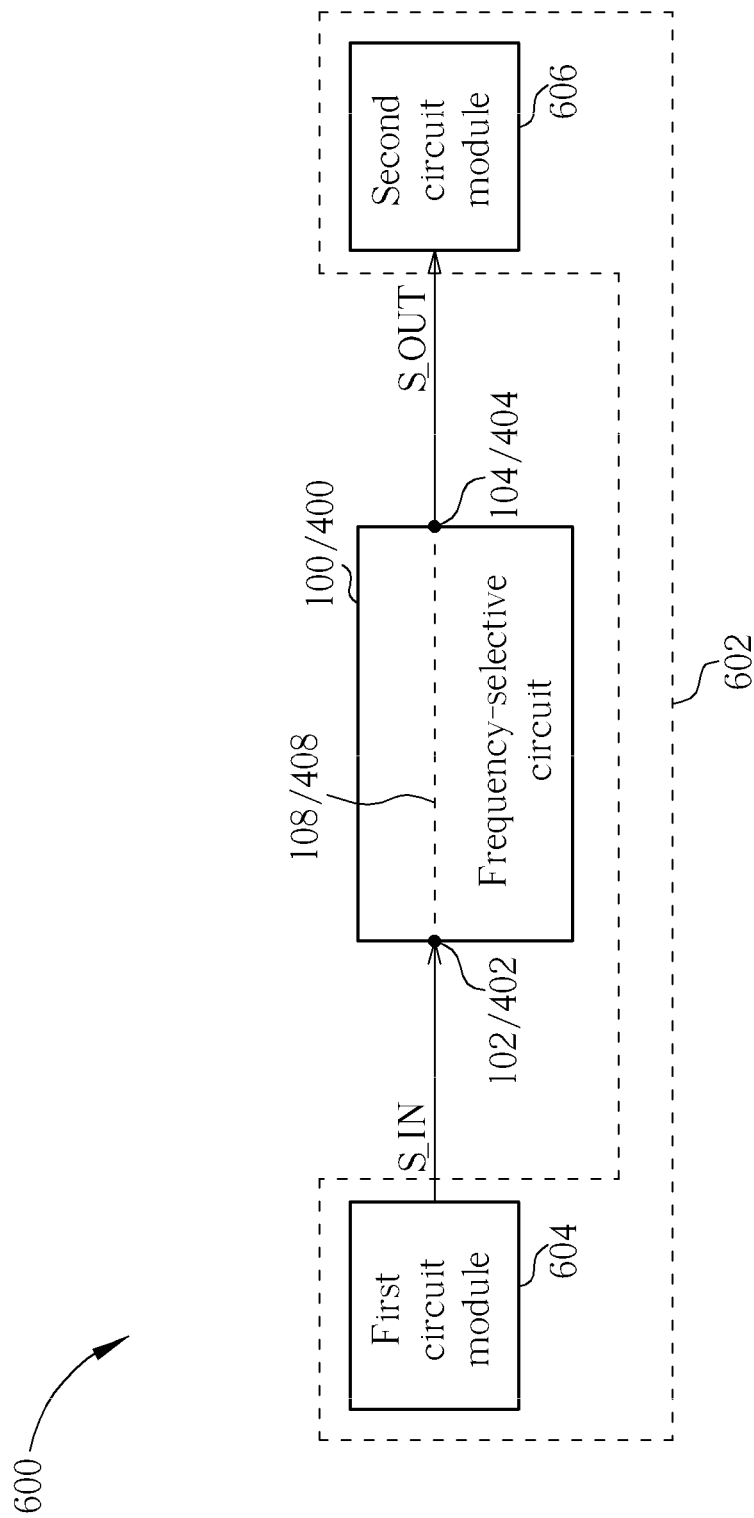
FIG. 6 is a block diagram illustrating a generalized signal processing apparatus having a frequency-selective circuit implemented therein.

FIG. 6 is a block diagram illustrating a generalized signal processing apparatus having a frequency-selective circuit implemented therein. The aforementioned frequency-selective circuit may be employed in any application which requires a frequency-selective signal path. As shown in FIG. 6, the signal processing apparatus 600 has the frequency-selective circuit 100/400 implemented therein to provide the signal path 108/408 that is frequency selective. In addition, the signal processing apparatus 600 has a signal processing circuit 602 including a first circuit module 604 and a second circuit module 606. The first circuit module 604 is electrically connected to the signal input port 102/402 of the frequency-selective circuit 100/400 and arranged to deal with the input signal S_IN. The second circuit module 606 is electrically connected to the signal output port 104/404 of the frequency-selective circuit 100/400 and arranged to deal with the output signal S_OUT. In one exemplary implementation, the signal processing apparatus 600 may be a receiver with the frequency-selective circuit 100/400 integrated therein or a transceiver including a receiver with the frequency-selective circuit 100/400 integrated therein. Please refer to FIG. 7, which is a diagram illustrating a receiver employing the hardware configuration shown in FIG. 6. The exemplary receiver 700 includes a receiving circuit 701 which realizes the signal processing circuit 602 shown in FIG. 6, wherein the first circuit module 604 is realized by a signal amplification stage 702 of the receiving circuit 701, and the second circuit module 606 is realized by a down-conversion stage 704 of the receiving circuit 701. The receiving circuit 701 may be implemented using any receiver architecture. For example, in this exemplary embodiment, the signal amplification stage 702 includes a plurality of amplifiers 712_1 and 712_2 such as low-noise amplifiers (LNAs). The amplifiers 712_1 and 712_2 may be implemented to amplify signals of different frequency bands. By way of example, but not limitation, the amplifier 712_1 is used to amplify signals complying with the GSM800 specification, and the amplifier 712_2 is used to amplify signals complying with the GSM900 specification. In this exemplary embodiment, the down-conversion stage 704 includes a mixer 714 operating according to an LO input generated from a clock source 715 implemented using a controllable oscillator (e.g., a VCO) 718 and a frequency divider 716. In addition, the down-conversion stage 704 further includes a low-pass filter (LPF) 720 and a direct-current offset compensation (DCOC) circuit 722. As a person skilled in the art can readily understand functions and operations of the elements included in the receiving circuit 701, further description is omitted here for brevity.

Figure 5:
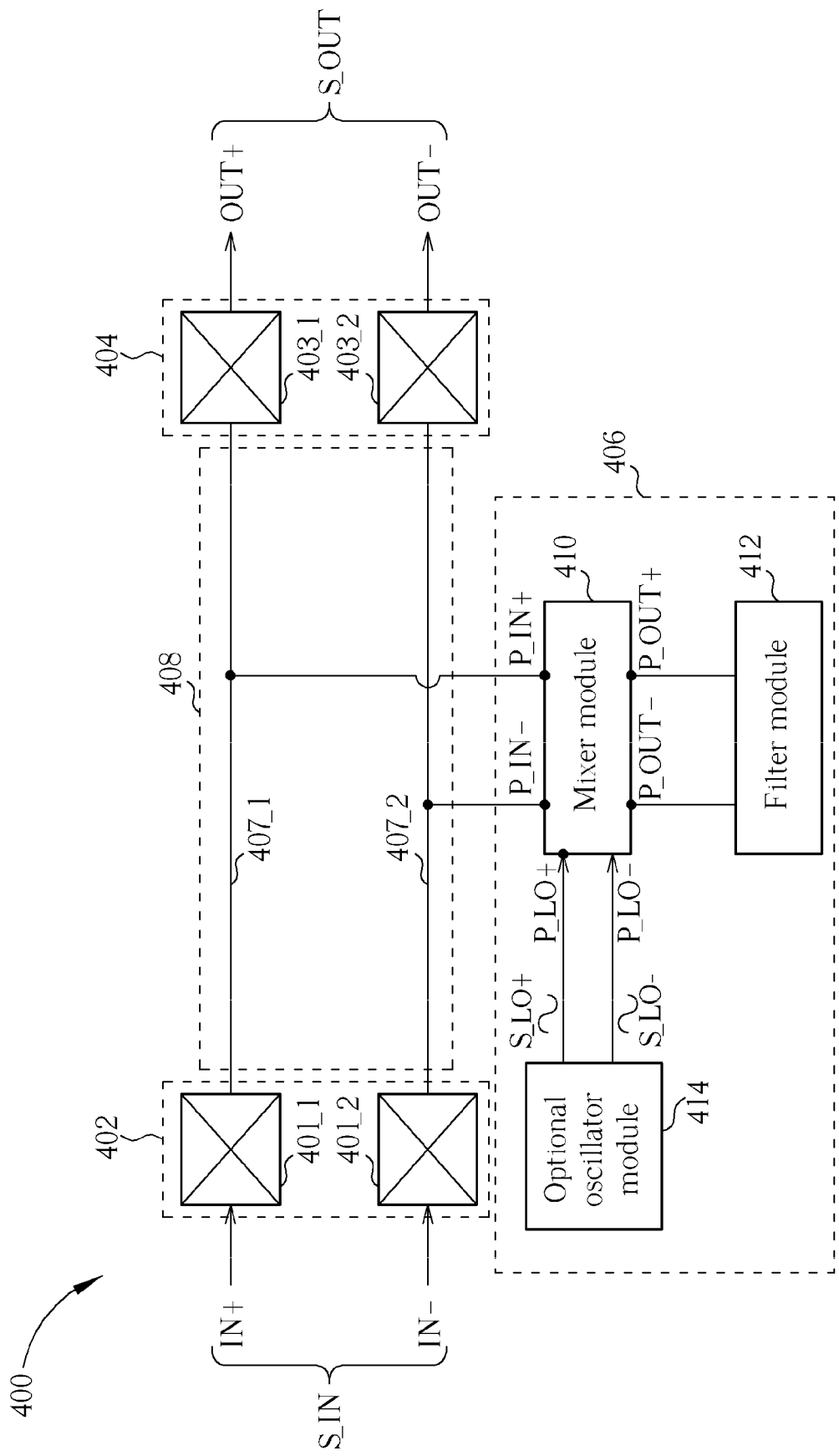
FIG. 5 is a diagram illustrating a frequency-selective circuit according to a second exemplary embodiment of the present invention.
Figure 7:
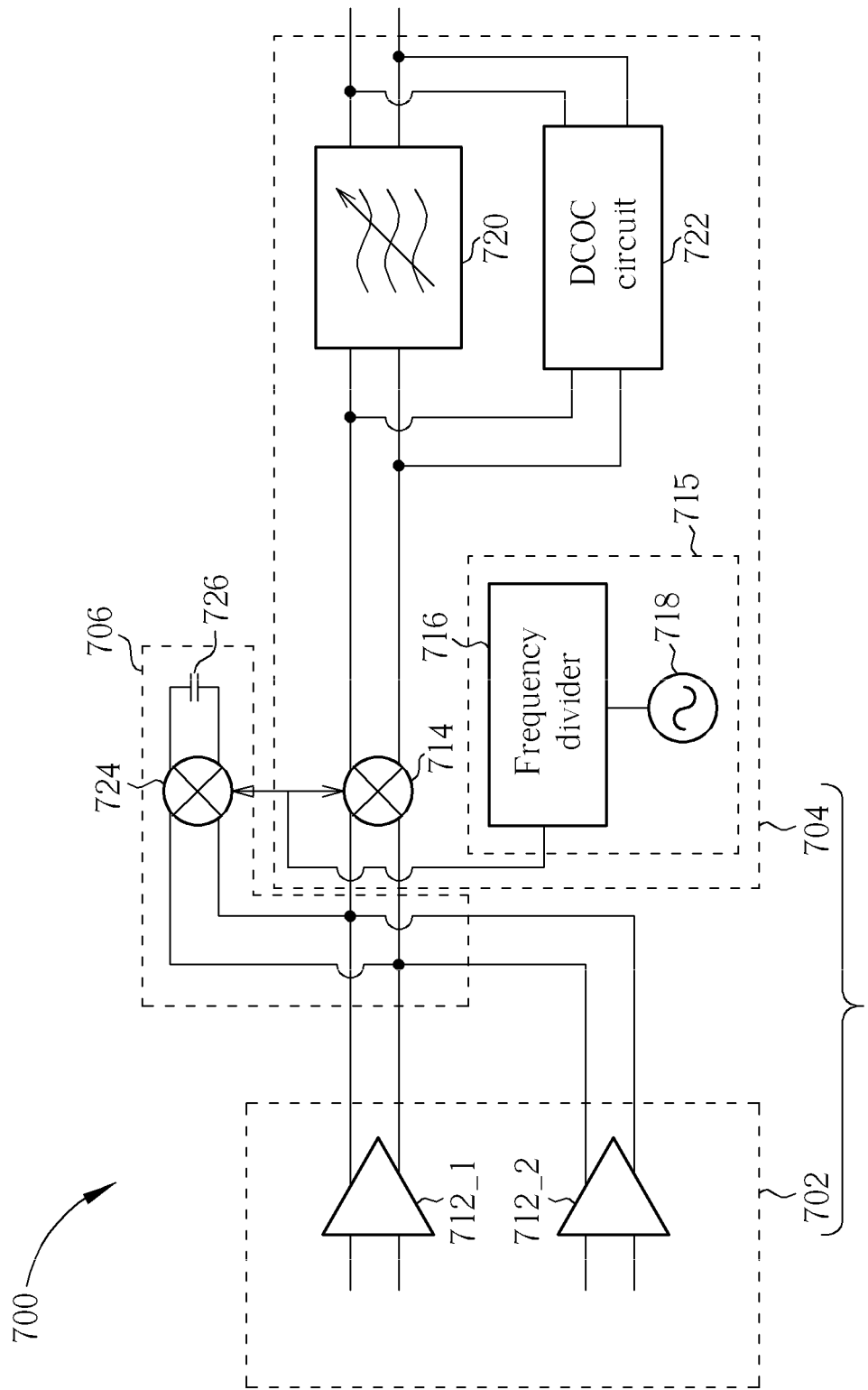
FIG. 7 is a diagram illustrating a receiver employing the hardware configuration shown in FIG. 6.

As shown in FIG. 7, the receiver 700 has a frequency-selective circuit 706 realized using the hardware configuration shown in FIG. 5, wherein the mixer module 410 is realized by a passive mixer 724 and the filter module 412 is realized by a capacitive load 726. In this exemplary embodiment, the LO input required by the passive mixer 724 is supplied by the clock source 715 in the down-conversion stage 704. As both of the mixers 714 and 724 share the same LO input generated from the clock source 715, the optional oscillator module 414 can be omitted. However, in an alternative design, the LO input required by the passive mixer 724 may be supplied by an oscillator module (e.g., the optional mixer module 414 shown in FIG. 5) included in the frequency-selective circuit 706. As the frequency-selective circuit 706 with the passive mixer 724 and the capacitive load 726 can attenuate block signals presented at the signal path, the linearity of the receiving circuit 701 can be improved.

In another exemplary implementation, the signal processing apparatus 600 may be a transmitter with the frequency-selective circuit 100/400 integrated therein or a transceiver including a transmitter with the frequency-selective circuit 100/400 integrated therein. Please refer to FIG. 8, which is a diagram illustrating a transmitter employing the hardware configuration shown in FIG. 6. The exemplary transmitter 800 includes a transmitting circuit 801 which realizes the signal processing circuit 602 shown in FIG. 6, wherein the first circuit module 604 is realized by an up-conversion stage 802 of the transmitting circuit 801, and the second circuit module 606 is realized by a power amplification stage 804 of the transmitting circuit 801. The transmitting circuit 801 may be implemented using any transmitter architecture. For example, in this exemplary embodiment, the up-conversion stage 802 includes a plurality of low-pass filters 812_1 and 812_2 for processing a plurality of incoming signals including an in-phase signal and a quadrature signal, a plurality of mixers 814_1 and 814_2 operating according to LO inputs generated from a clock source 815 implemented using a controllable oscillator (e.g., a VCO) 816 and a frequency divider 817, and an adder 818 for combining up-conversion outputs generated from the preceding mixers 814_1 and 814_2. It should be noted that the LO inputs of the mixers 814_1 and 814_2 have the same frequency but different phases. For example, there is a 90-degree phase difference between these LO inputs. Regarding the power amplification stage 804, it includes a programmable gain amplifier (PGA) 820 for amplifying the signal to be transmitted. As a person skilled in the art can readily understand functions and operations of the elements included in the transmitting circuit 801, further description is omitted here for brevity.

Figure 8:
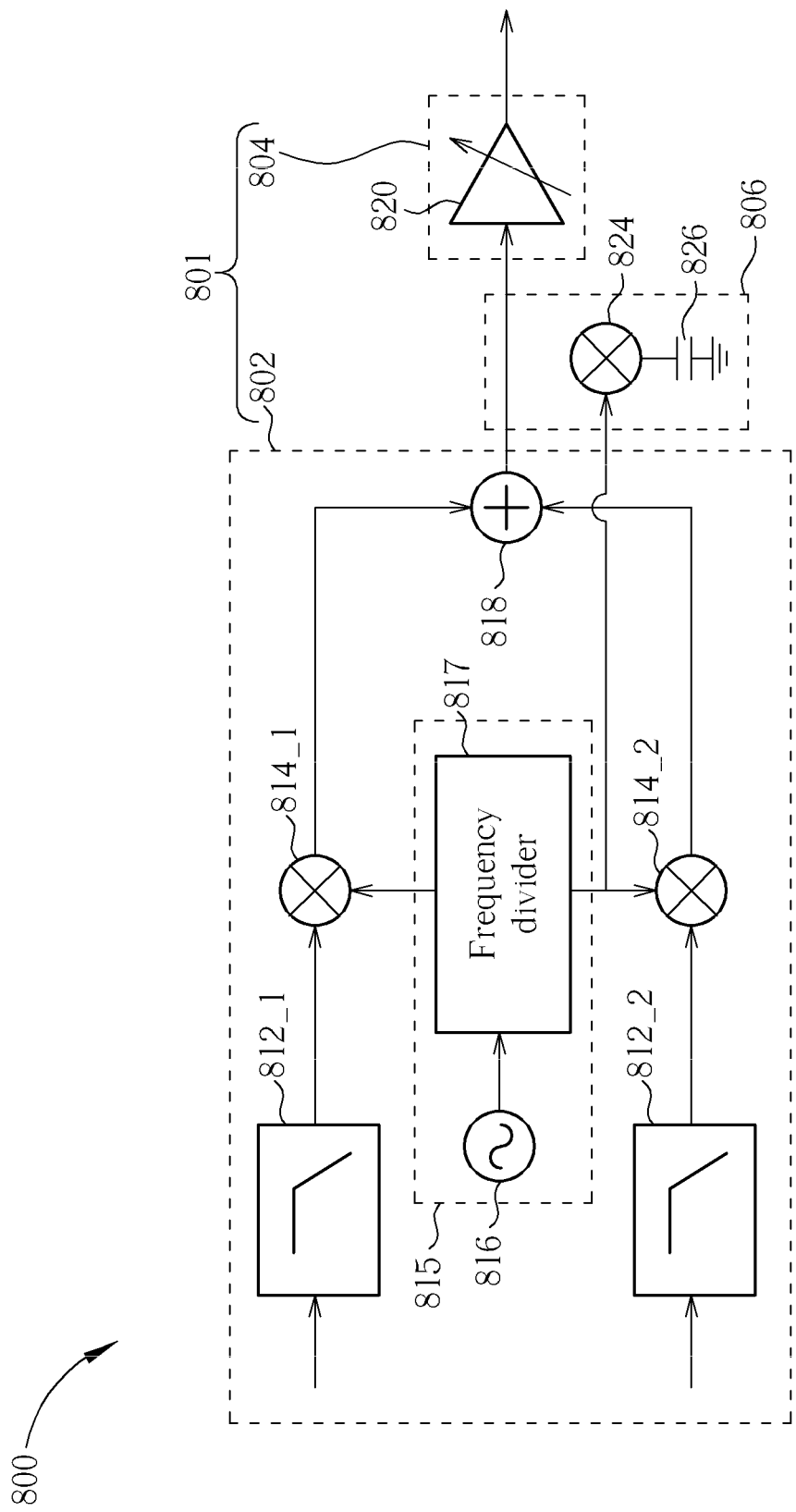
FIG. 8 is a diagram illustrating a transmitter employing the hardware configuration shown in FIG. 6.

As shown in FIG. 8, the receiver 800 has a frequency-selective circuit 806 realized using the hardware configuration shown in FIG. 1, wherein the mixer module 110 is realized by a passive mixer 824 and the filter module 112 is realized by a capacitive load 826. In this exemplary embodiment, the LO input required by the passive mixer 824 is supplied by the clock source 815 included in the up-conversion stage 802. As both of the mixers 814_2 and 824 share the same LO input generated from the clock source 815, the optional oscillator module 114 can be omitted. However, in an alternative design, the LO input required by the passive mixer 824 may be supplied by an oscillator module (e.g., the optional mixer module 114) included in the frequency-selective circuit 806. As the frequency-selective circuit 806 with the passive mixer 824 and the capacitive load 826 can attenuate OOB noise, it is therefore allowed to use a lower-power frequency divider and/or a lower-power controllable oscillator. Thus, the LO phase noise requirement can be relaxed.

In yet another exemplary implementation, the signal processing apparatus 600 may be an amplifier with the frequency-selective circuit 100/400 integrated therein. Please refer to FIG. 9, which is a diagram illustrating an amplifier employing the hardware configuration shown in FIG. 6. The exemplary amplifier 900 includes an amplifier circuit 901 which realizes the signal processing circuit 602 shown in FIG. 6, wherein the first circuit module 604 is realized by a load 902 of the amplifier circuit 901, and the second circuit module 606 is realized by an amplification stage 904 of the amplifier circuit 901. The amplifier circuit 901 may be implemented using any amplifier architecture. For example, in this exemplary embodiment, the load 902 includes a plurality of resistors Rd_1 and Rd_2, and the amplification stage 904 includes a plurality of transistors M1_1, M1_2, M2_1, and M2_2, a plurality of capacitors C1 and C2, a plurality of inductors Ls_1 and Ls_2, and a resistor Rs. As a person skilled in the art can readily understand functions and operations of the elements included in the amplifier circuit 901, further description is omitted here for brevity.

Figure 9:
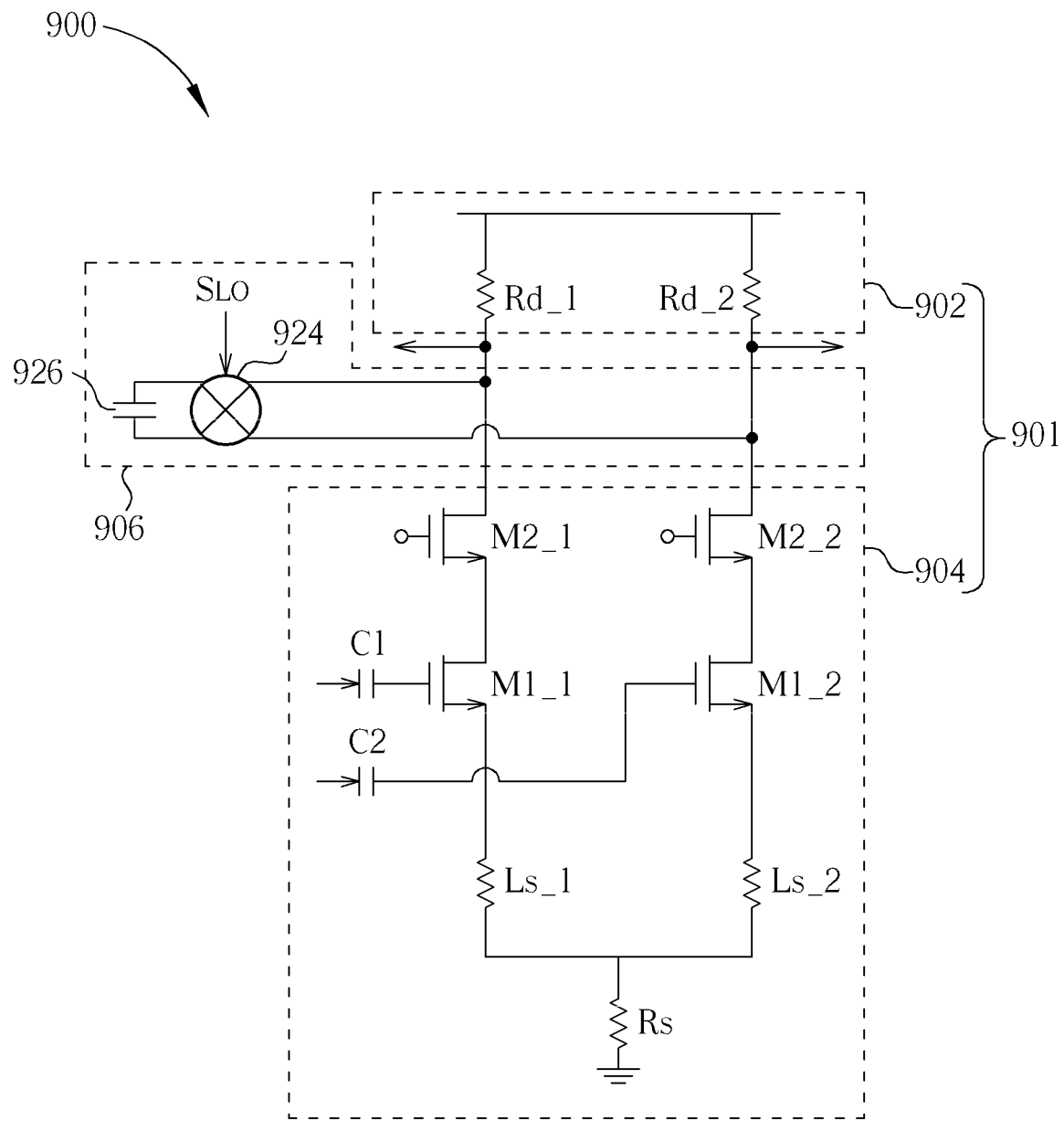
FIG. 9 is a diagram illustrating an amplifier employing the hardware configuration shown in FIG. 6.

As shown in FIG. 9, the amplifier 900 has a frequency-selective circuit 906 realized using the hardware configuration shown in FIG. 5, wherein the mixer module 410 is realized by a passive mixer 924 and the filter module 412 is realized by a capacitive load 926. In this exemplary embodiment, the LO input $S_{LO}$ required by the passive mixer 924 may be supplied by a dedicated clock source (e.g., the optional oscillator module 414) or a common clock source shared by the frequency-selective circuit 906 and other circuitry. As the frequency-selective circuit 906 with the passive mixer 924 and the capacitive load 926 is capable of shaping the frequency response of the amplifier circuit 901, the amplifier 900 with a narrower bandwidth can be realized.

Figure 10:
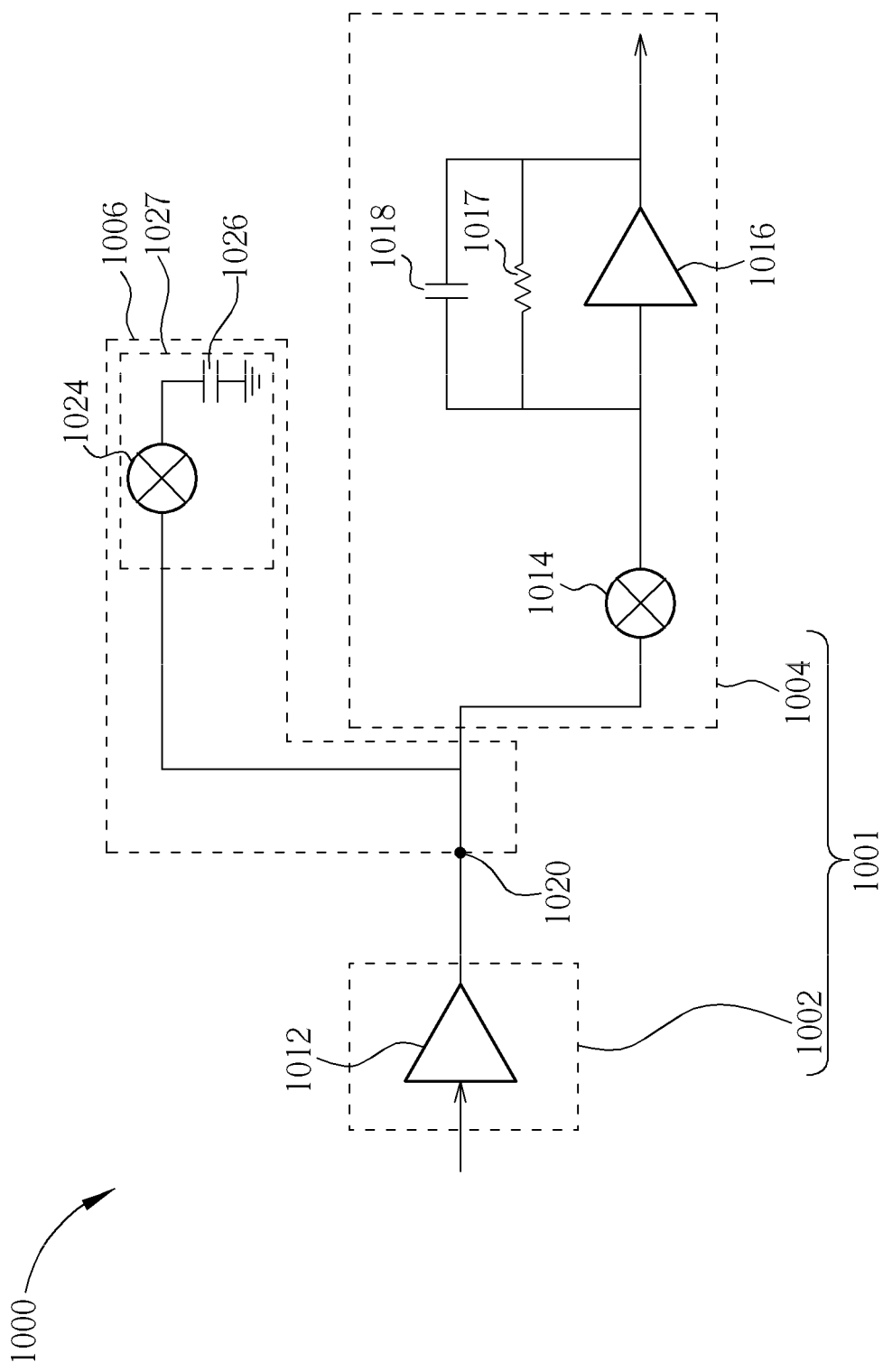
FIG. 10 is a diagram illustrating another receiver employing the hardware configuration shown in FIG. 6.

As mentioned above, the proposed frequency-selective circuit has a narrow band response due to the mixer module and the filter module, and accordingly provides a frequency-selective signal path. If the input impedance response of the second circuit module 606 is properly designed, the frequency selectivity characteristic of the signal processing apparatus 600 can be improved. Please refer to FIG. 10, which is a diagram illustrating another receiver employing the hardware configuration shown in FIG. 6. The exemplary receiver 1000 includes a receiving circuit 1001 which realizes the signal processing circuit 602 shown in FIG. 6, wherein the first circuit module 604 is realized by a signal amplification stage 1002 of the receiving circuit 1001, and the second circuit module 606 is realized by a down-conversion stage 1004 of the receiving circuit 1001. In this exemplary embodiment, the signal amplification stage 1002 includes an amplifier 1012 such as an LNA, and the down-conversion stage 1004 includes a mixer 1014, an operational amplifier 1016, a feedback resistor 1017, and a compensation capacitor 1018. As shown in FIG. 10, the receiver 1000 further includes a frequency-selective circuit 1006 realized using the hardware configuration shown in FIG. 1, wherein the mixer module 110 is realized by a passive mixer 1024 and the filter module 112 is realized by a capacitive load 1026. Thus, the combination of the passive mixer 1024 and the capacitive load 1026 forms a frequency response control block 1027. It should be noted that the LO input required by the passive mixer 724 and the LO input required by the mixer 1014 may have the same frequency when they are generated from the same clock source implemented in the down-conversion stage 1004 or may have different frequencies when they are generated from different clock sources respectively implemented in the down-conversion stage 1004 and the frequency-selective circuit 1006.

Figure 11:
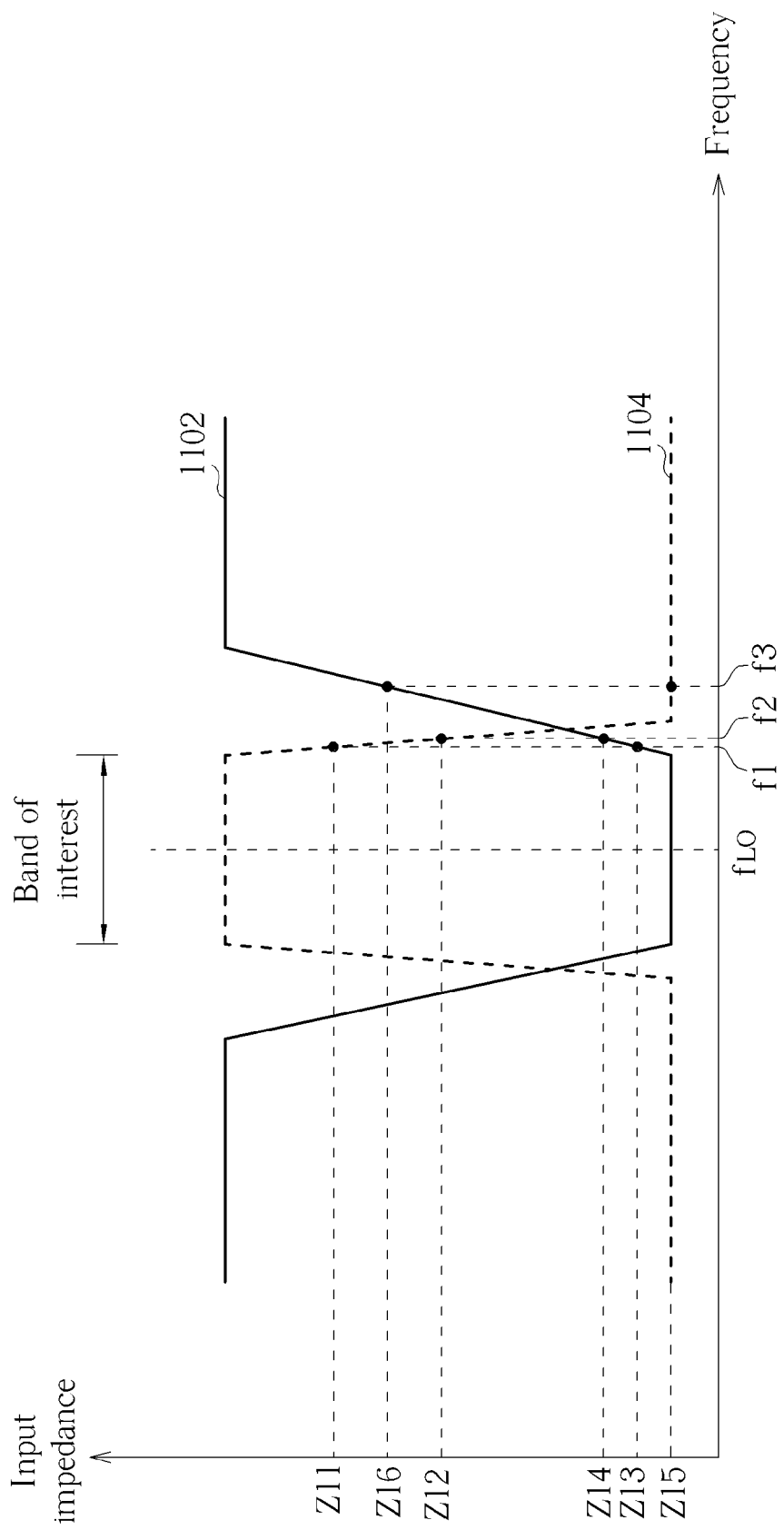
FIG. 11 is a diagram illustrating the input impedance response of a down-conversion stage and the input impedance response of a frequency response control block.

Suppose that the passive mixer 1024 and the mixer 1014 share the same LO input with the same frequency $f_{LO}$. The combination of the operational amplifier 1016, the feedback resistor 1017, and the compensation capacitor 1018 forms a single-pole system. In this exemplary embodiment, with a proper design of the frequency response of the impedance of such a single-pole system, the input impedance response of the down-conversion stage 1004 disposed at a second signal processing path (e.g., a main path of the receiver 1000) has a minimum impedance value at the frequency $f_{LO}$. Regarding the input impedance response of the frequency response control block 1027 disposed at a first signal processing path (e.g., a filter path of the receiver 1000), it has a maximum impedance value at the frequency $f_{LO}$. Please refer to FIG. 11, which is a diagram illustrating the input impedance response of the down-conversion stage 1004 and the input impedance response of the frequency response control block 1027. The input impedance response of the down-conversion stage 1004 is represented by the characteristic curve 1102, and the input impedance response of the frequency response control block 1027 is represented by the characteristic curve 1104. As can be seen from the figure, the input impedance response of the frequency response control block 1027 is different from the input impedance response of the down-conversion stage 1004. More specifically, the input impedance response of the frequency response control block 1027 has a first impedance value Z11 at a first frequency f1 and a second impedance value Z12 at a second frequency f2, where an offset between the first frequency f1 and the frequency $f_{LO}$ of the LO input is smaller than an offset between the second frequency f2 and the frequency $f_{LO}$ of the LO input, and the first impedance value Z11 is greater than the second impedance value Z12. Regarding the input impedance response of the down-conversion stage 1004, it has a third impedance value Z13 at the first frequency f1 and a fourth impedance value Z14 at the second frequency f2, and the fourth impedance value Z14 is greater than the third impedance value Z13. Further, at a specific frequency f3 different from f1 and f2, an impedance value Z15 of the input impedance response of the frequency response control block 1027 is smaller than an impedance value Z16 of the input impedance response of the down-conversion stage 1004. As the frequency response control block 1027 and the down-conversion stage 1004 viewed from the signal input port 1020 of the frequency-selective circuit 1006 are connected in parallel. Thus, the combination of the input impedance response of the down-conversion stage 1004 and the input impedance response of the frequency response control block 1027 would present a low and substantially constant impedance across the entire band of interest. To put it another way, an input impedance response presented at the signal input port 1020 has a low and substantially constant impedance value within a specific frequency band which has the frequency $f_{Lo}$ included therein, which is beneficial to certain current-mode applications. For example, such an input impedance design is very good for receiver linearity It should be noted that the combination of the input impedance response of the down-conversion stage 1004 and the input impedance response of the frequency response control block 1027 also determines the frequency response/frequency selectivity. As shown in FIG. 11, the characteristic of the input impedance response of the down-conversion stage 1004 is opposite to that of the input impedance response of the frequency response control block 1027. More specifically, a filter path at which the frequency response control block 1027 is disposed has high inband impedance and low OOB impedance, whereas a main path at which the down-conversion stage 1004 is disposed has low inband impedance and high OOB impedance. Thus, compared to only using the frequency-selective circuit in the filter path to control the frequency selectivity, using the frequency-selective circuit at the filter path as well as a properly configured second circuit module at the main path can improve the frequency selectivity due to increased impedance discrepancy between the frequency-selective circuit 1027 and the second circuit module 1004. To put it simply, with a proper design of the input impedance response of the main path, a sharper bandpass filter response can be presented to thereby effectively improve the frequency selectivity.

Figure 12:
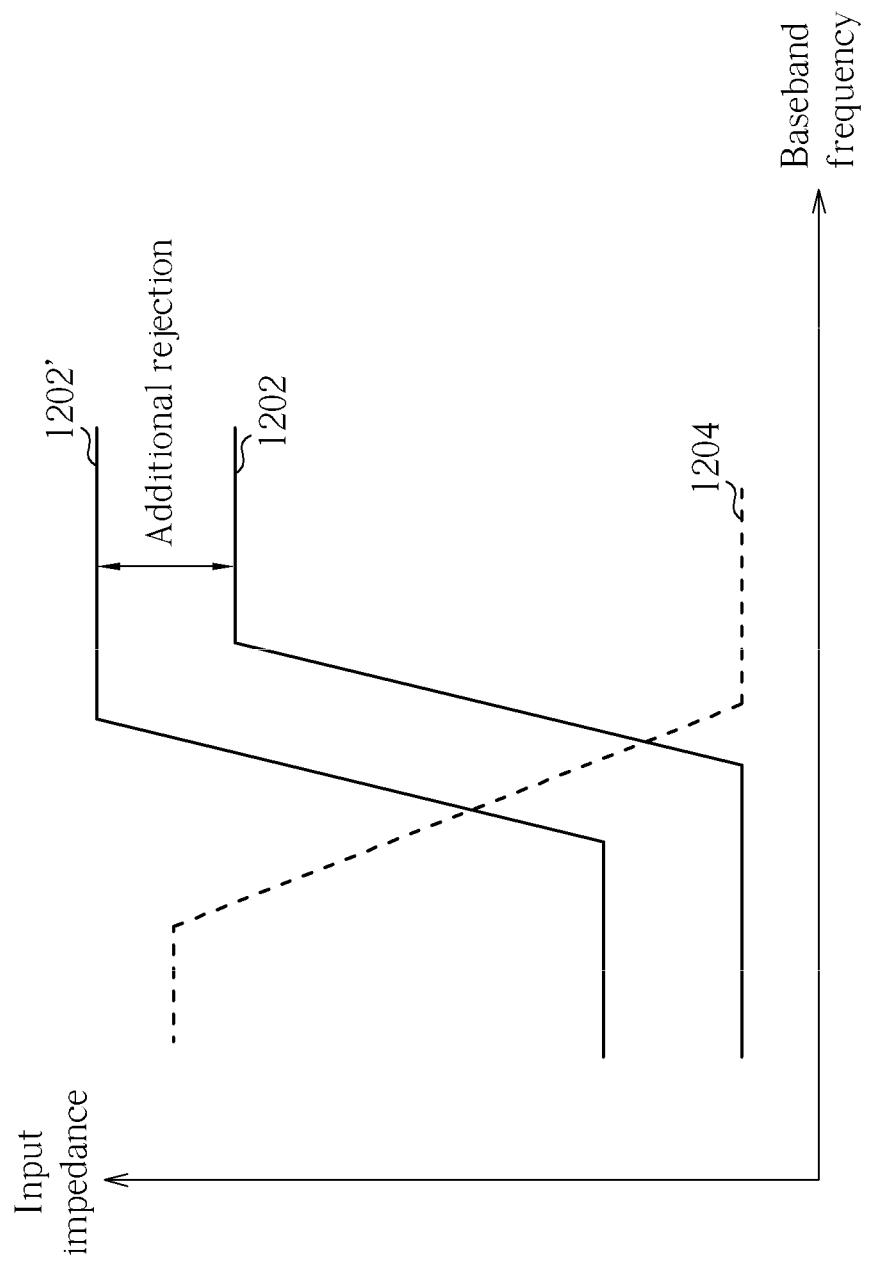
FIG. 12 is a diagram illustrating an exemplary result of changing the impedance magnitude.

As mentioned above, the second circuit module at the main path can improve the frequency selectivity if the input impedance response thereof is properly designed. The present invention therefore proposes shifting the impedance magnitude and/or changing the response shape for adjusting the frequency selectivity (i.e., the frequency response of the main path). To adjust the frequency selectivity characteristic of the signal processing apparatus 1000, at least one of the frequency response control block 1027 and the second circuit module (e.g., the down-conversion stage 1004) may be adjusted to shift the magnitude of a corresponding input impedance response. For example, to increase far-away frequency selectivity, the turn-on resistance of the mixer 1024 in the filter path may be lowered by increasing the switch/transistor size of the mixer 1024, and the turn-on resistance of the mixer 1014 in the main path may be increased by decreasing the switch/transistor size of the mixer 1014. FIG. 12 is a diagram illustrating an exemplary result of changing the impedance magnitude. The original input impedance response of the down-conversion stage 1004 is represented by the characteristic curve 1202, the adjusted input impedance response of the down-conversion stage 1004 is represented by the characteristic curve 1202', and the unchanged input impedance response of the frequency response control block 1027 is represented by the characteristic curve 1204. As can be seen from the figure, addition rejection at frequencies far away from the LO frequency is provided due to the impedance magnitude change.

Figure 13:
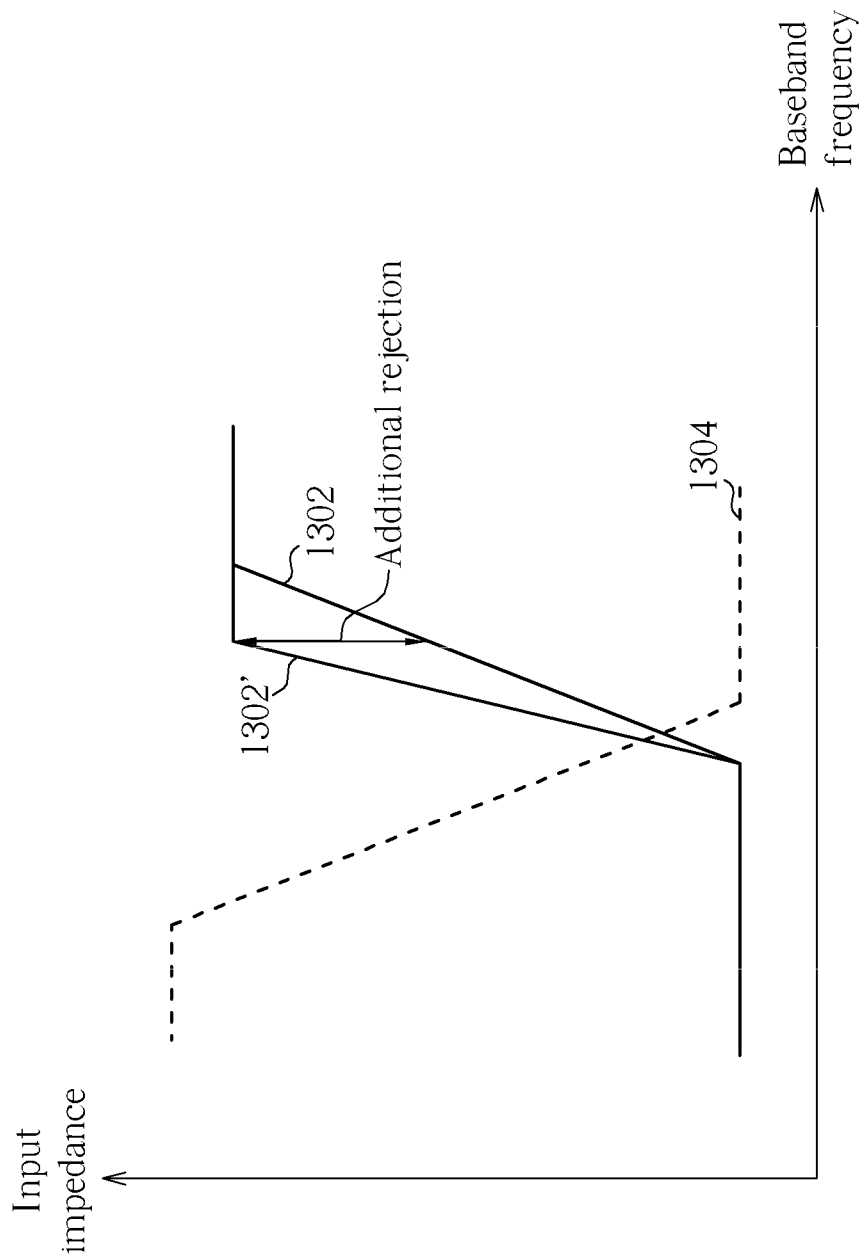
FIG. 13 is a diagram illustrating an exemplary result of changing the response shape.

To adjust the frequency selectivity characteristic of the signal processing apparatus 1000, at least one of the frequency response control block 1027 and the second circuit module (e.g., the down-conversion stage 1004) may be adjusted to change a corresponding shape of the input impedance response. By way of example, but not limitation, the number and position of poles and zeros of an operational amplifier circuit included in the second circuit module disposed at the second signal processing path (e.g., the main path) may be adjusted to change the shape of the input impedance response of the second circuit module. For instance, to increase the near frequency selectivity, the increase rate of the input impedance of the down-conversion stage 1004 may be increased by using a multi-pole system to realize the operational amplifier circuit following the mixer 1014. FIG. 13 is a diagram illustrating an exemplary result of changing the response shape. The original input impedance response of the down-conversion stage 1004 is represented by the characteristic curve 1302, the adjusted input impedance response of the down-conversion stage 1004 is represented by the characteristic curve 1302', and the unchanged input impedance response of the frequency response control block 1027 is represented by the characteristic curve 1304. As can be seen from the figure, addition rejection at frequencies close to the LO frequency is provided due to the response shape change.

Regarding the exemplary receiver 1000 shown in FIG. 10, one end of the capacitive load 1026 is electrically connected to the passive mixer 1024, and the other end of the capacitive load 1026 is grounded. That is, there is no output generated from the frequency-selective circuit 1006 to the down-conversion stage 1004. However, other exemplary receiver designs employing the same frequency selectivity conception are feasible. Please refer to FIG. 14, which is a diagram illustrating one alternative receiver design according to the present invention. The exemplary receiver 1400 includes a signal amplification stage 1402, a down-conversion stage 1404, and a frequency-selective circuit 1406. In this exemplary embodiment, the signal amplification stage 1402 includes an amplifier 1412 such as an LNA, the down-conversion stage 1404 includes a mixer 1014 and a filter such as a low-pass filter (LPF) 1416, and the frequency-selective circuit 1406 includes a mixer 1424 and a filter such as an LPF 1426. The function of the frequency-selective circuit 1406 is identical to that of the frequency-selective circuit 1006 shown in FIG. 10. That is, the combination of the passive mixer 1424 and the LPF 1426 is capable of controlling/shaping the frequency response presented at a signal path between a signal input port 1420 and a signal output port 1422. It should be noted that the LO input required by the mixer 1424 and the LO input required by the mixer 1414 may have the same frequency when they are generated from the same clock source implemented in the down-conversion stage 1404 or may have different frequencies when they are generated from different clock sources respectively implemented in the down-conversion stage 1404 and the frequency-selective circuit 1406.

Figure 14:
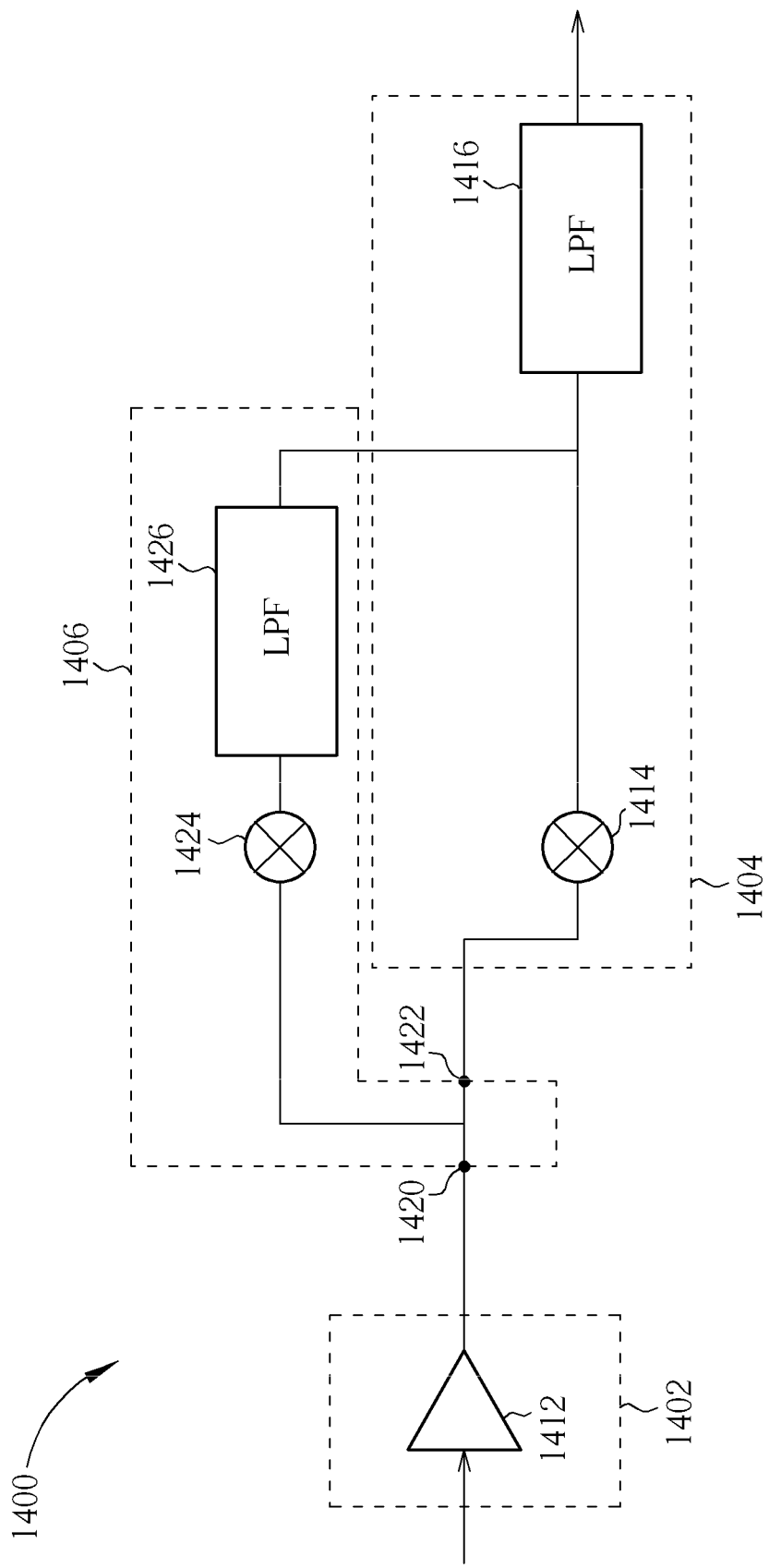
FIG. 14 is a diagram illustrating one alternative receiver design according to the present invention.

The major difference between the frequency-selective circuit 1406 shown in FIG. 14 and the frequency-selective circuit 1006 shown in FIG. 10 is that an output of the frequency-selective circuit 1406 is fed into the down-conversion stage 1404. As can be seen from FIG. 14, an output of the LPF 1406 would be added to an output of the mixer 1414. With proper design of the mixers 1414 and 1424 and/or the LPFs 1416 and 1426, the frequency-selective circuit 1406 and the down-conversion stage 1404 may have an input impedance response relationship similar to that shown in FIG. 11. For example, each of the LPFs 1416 and 1426 may be implemented using a resistor and a capacitor, wherein the resistor included in the LPF 1426 may have a larger resistance value than the resistor included in the LPF 1416, and the capacitor included in the LPF 1426 may have a larger capacitance value than the capacitor included in the LPF 1416. Therefore, the corner frequency of the LPF 1426 would be lower than that of the LPF 1416. Regarding the implementation of the mixers 1414 and 1424, the turn-on resistance of the mixer 1414 may be larger than that of the mixer 1424.

Regarding the in-band signal (i.e., the wanted signal), its current at the signal input port 1420 may be split into a first current flowing through a slave path at which the frequency-selective circuit 1406 is disposed and a second current flowing through a master path at which the down-conversion stage 1404 is disposed. It should be noted that the second current would be much larger than the first current since the input impedance of the frequency-selective circuit 1406 viewed from the signal input port 1420 by the in-band signal is configured to be much greater than the input impedance of the down-conversion stage 1404 viewed from the signal input port 1420 by the in-band signal. As the frequency-selective circuit 1406 is arranged to filter out signal components belonging to the OOB signal (i.e., the unwanted blocker signal), the first current flowing through the frequency-selective circuit 1406 still carries the signal components of the in-band signal, and is then combined with a mixer output generated from the mixer 1414 which receives the second current. In this way, most of the signal components of the in-band signal will be retained under such a receiver architecture shown in FIG. 14.

Regarding the OOB signal (i.e., the unwanted blocker signal), its current at the signal input port 1420 may also be split into a first current flowing through the slave path at which the frequency-selective circuit 1406 is disposed and a second current flowing through the master path at which the down-conversion stage 1404 is disposed. It should be noted that the first current would be much larger than the second current since the input impedance of the down-conversion stage 1404 viewed from the signal input port 1420 by the OOB signal is configured to be much greater that the input impedance of the frequency-selective circuit 1406 viewed from the signal input port 1420 by the OOB signal. As the frequency-selective circuit 1406 is arranged to filter out signal components belonging to the OOB signal (i.e., the unwanted blocker signal), most of the signal components of the OOB signal will be filtered out under such a receiver architecture shown in FIG. 14.

Figure 15:
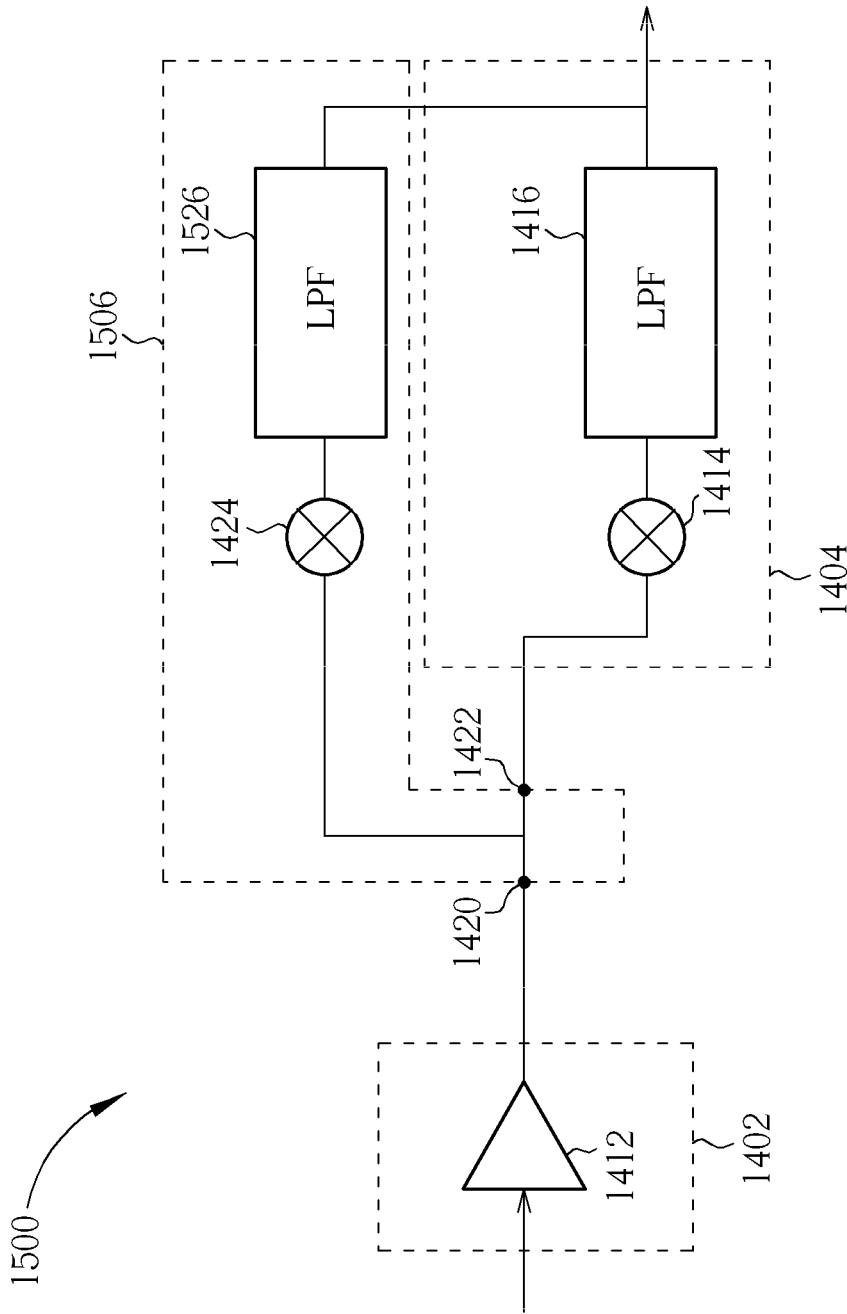
FIG. 15 is a diagram illustrating another alternative receiver design according to the present invention.

FIG. 15 is a diagram illustrating another alternative receiver design according to the present invention. The circuit architecture of the exemplary receiver 1500 is similar to that of the exemplary receiver 1400. The major difference between them is that an output of the LPF 1526 in the frequency-selective circuit 1506 shown in FIG. 15 is combined with an output of the LPF 1416 in the down-conversion stage 1404. The same objective of making most of the current of the in-band signal flow through the master path at which the down-conversion stage is disposed and making most of the current of the OOB signal flow through the slave path at which the frequency-selective circuit is disposed is achieved. As a person skilled in the art can readily understand technical features of the receiver 1500 after reading above paragraphs directed to the receiver 1400 shown in FIG. 14, further description is omitted here for brevity.

It should be noted that the frequency selectivity characteristic of the receiver with multi-path filtering, as shown in FIG. 14 and FIG. 15, may be adjusted by configuring the mixers and/or the filters disposed at the master path and the slave path. In this way, the receiver can attenuate the unwanted OOB/blocker signal more effectively to thereby improve the receiver linearity.

As shown in FIG. 14 and FIG. 15, each of the exemplary receivers 1400 and 1500 is arranged in a single-ended configuration to meet the requirement of a single-ended application. However, each of the proposed exemplary receivers 1400 and 1500 may also be properly modified to have a differential configuration for meeting the requirement of a differential application. This also obeys the spirit of the present invention, and falls within the scope of the present invention.

Briefly summarized, an exemplary method of setting a frequency selectivity characteristic of a signal processing apparatus may include the steps of configuring a first signal processing path, included in the signal processing apparatus and electrically connected to a signal input port of the signal processing apparatus, to have a first input impedance response, and configuring a second signal processing path, included in the signal processing apparatus and electrically connected to the signal input port, to have a second input impedance response, wherein the frequency selectivity characteristic is set by the first input impedance response and the second input impedance response that is different from the first input impedance response.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal processing apparatus, comprising:
   a frequency-selective circuit, comprising:
      a signal input port;
      a signal output port; and
      a frequency response control block, electrically connected to a signal path between the signal input port and the signal output port, the frequency response control block arranged to control a frequency response of the frequency-selective circuit according to a frequency of an oscillating signal, wherein the frequency response control block is not part of the signal path; and
   a signal processing circuit, comprising:
      a first circuit module, electrically connected to the signal input port and arranged to deal with an input signal received by the signal input port; and
      a second circuit module, electrically connected to the signal output port and arranged to deal with an output signal generated from the signal output port;
      wherein an input impedance response of the second circuit module has a first impedance value at a first frequency and a second impedance value at a second frequency, an offset between the first frequency and the frequency of the oscillating signal is smaller than an offset between the second frequency and the frequency of the oscillating signal, and the second impedance value is greater than the first impedance value.

2. The signal processing apparatus of claim 1, wherein the signal processing circuit is a receiving circuit, the first circuit module is a signal amplification stage of the receiving circuit, and the second circuit module is a down-conversion stage of the receiving circuit.

3. The signal processing apparatus of claim 1, wherein the signal processing circuit is a transmitting circuit, the first circuit module is an up-conversion stage of the transmitting circuit, and the second circuit module is a power amplification stage of the transmitting circuit.

4. The signal processing apparatus of claim 1, wherein an input impedance response of the frequency response control block has a third impedance value at the first frequency and a fourth impedance value at the second frequency, and the third impedance value is greater than the fourth impedance value.

5. The signal processing apparatus of claim 1, wherein an input impedance response presented at the signal input port has a substantially constant impedance value within a specific frequency band which has the frequency of the oscillating signal included therein.

6. The signal processing apparatus of claim 1, wherein the frequency response of the frequency-selective circuit has a first gain at a first frequency and a second gain at a second frequency, an offset between the first frequency and the frequency of the oscillating signal is smaller than an offset between the second frequency and the frequency of the oscillating signal, and the first gain is greater than the second gain.

7. The signal processing apparatus of claim 1, wherein the frequency response control block is connected to the signal path in a parallel manner.

8. The signal processing apparatus of claim 1, wherein most of wanted signal components within a specific frequency band of the input signal are transmitted to the signal output port via the signal path; and most of unwanted signal components beyond the specific frequency band of the input signal are guided to flow through the frequency response control block.

9. The signal processing apparatus of claim 2, wherein the frequency response control block comprises:
   a first mixer module, having a first port, a second port, and a local oscillator (LO) port, wherein the first port is electrically connected to the signal path, and the first mixer module operates according to the oscillating signal being an LO input received by the LO port; and
   a filter module, electrically connected to the second port of the first mixer module; and the down-conversion stage comprises:
   a second mixer module, operating according to the LO input; and
   an oscillator module, arranged to generate the LO input to both of the first mixer module and the second mixer module.

10. The signal processing apparatus of claim 2, wherein the frequency response control block comprises:
   a first mixer module, having a first port, a second port, and a local oscillator (LO) port, wherein the first port is electrically connected to the signal path, and the first mixer module operates according to the oscillating signal being a first LO input received by the LO port;
   a first oscillator module, electrically connected to the first mixer module and arranged to generate the first LO input to the first mixer module; and
   a filter module, electrically connected to the second port of the first mixer module; and the down-conversion stage comprises:
   a second mixer module, operating according a second LO input; and
   a second oscillator module, arranged to generate the second LO input to the second mixer module.

11. The signal processing apparatus of claim 3, wherein the frequency response control block comprises:
   a first mixer module, having a first port, a second port, and a local oscillator (LO) port, wherein the first port is electrically connected to the signal path, and the first mixer module operates according to the oscillating signal being an LO input received by the LO port; and
   a filter module, electrically connected to the second port of the first mixer module; and the up-conversion stage comprises:
   a second mixer module, operating according to the LO input; and
   an oscillator module, arranged to generate the LO input to both of the first mixer module and the second mixer module.

12. The signal processing apparatus of claim 3, wherein the frequency response control block comprises:
   a first mixer module, having a first port, a second port, and a local oscillator (LO) port, wherein the first port is electrically connected to the signal path, and the first mixer module operates according to the oscillating signal being a first LO input received by the LO port;
   a first oscillator module, electrically connected to the first mixer module and arranged to generate the first LO input to the first mixer module; and
   a filter module, electrically connected to the second port of the first mixer module; and the up-conversion stage comprises:
   a second mixer module, operating according a second LO input; and
   a second oscillator module, arranged to generate the second LO input to the second mixer module.

13. A method of setting a frequency selectivity characteristic of a signal processing apparatus, comprising:
   configuring a first signal processing path, included in the signal processing apparatus and electrically connected to a signal input port of the signal processing apparatus, to have a first input impedance response; and configuring a second signal processing path, included in the signal processing apparatus and electrically connected to the signal input port, to have a second input impedance response different from the first input impedance response; wherein the signal processing apparatus includes a first mixer disposed at the first signal processing path and a second mixer disposed at the second signal processing path;

adjusting the frequency selectivity characteristic of the signal processing apparatus by shifting a corresponding magnitude of at least one of the first input impedance response and the second input impedance response by adjusting turn-on resistance of at least one of the first mixer and the second mixer; wherein an impedance value of the first input impedance response at a first frequency is larger than an impedance value of the second input impedance response at the first frequency; an impedance value of the first input impedance response at a second frequency is smaller than an impedance value of the second input impedance response at the second frequency; and the second frequency is different from the first frequency.

14. The method of claim 13, further comprising: adjusting the frequency selectivity characteristic of the signal processing apparatus by changing a corresponding shape of at least one of the first input impedance response and the second input impedance response.

15. The method of claim 13, wherein the frequency selectivity characteristic of the signal processing apparatus is set by the first input impedance response and the second input impedance response to make most of wanted signal components within a specific frequency band of an input signal received at the signal input port guided to flow through one of the first signal processing path and the second signal processing path, and make most of unwanted signal components beyond the specific frequency band of the input signal guided to flow through another of the first signal processing path and the second signal processing path.

16. The method of claim 13, wherein a maximum impedance value of the first input impedance response occurs at a third frequency; a minimum impedance value of the second input impedance response occurs at the third frequency; and an offset between the first frequency and the third frequency is smaller than an offset between the second frequency and the third frequency.

17. The method of claim 14, wherein the signal processing apparatus includes an operational amplifier circuit disposed at the second signal processing path, and the step of changing the corresponding shape of at least one of the first input impedance response and the second input impedance response comprises:

adjusting the number and position of poles and zeros of the operational amplifier circuit.

* * * * *